Dec. 21, 1954   L. B. BARNETT   2,697,460
COMBINED TOOL-CARRYING HINGED BOX AND POWER WORKTABLE
Filed Oct. 16, 1950   4 Sheets-Sheet 1
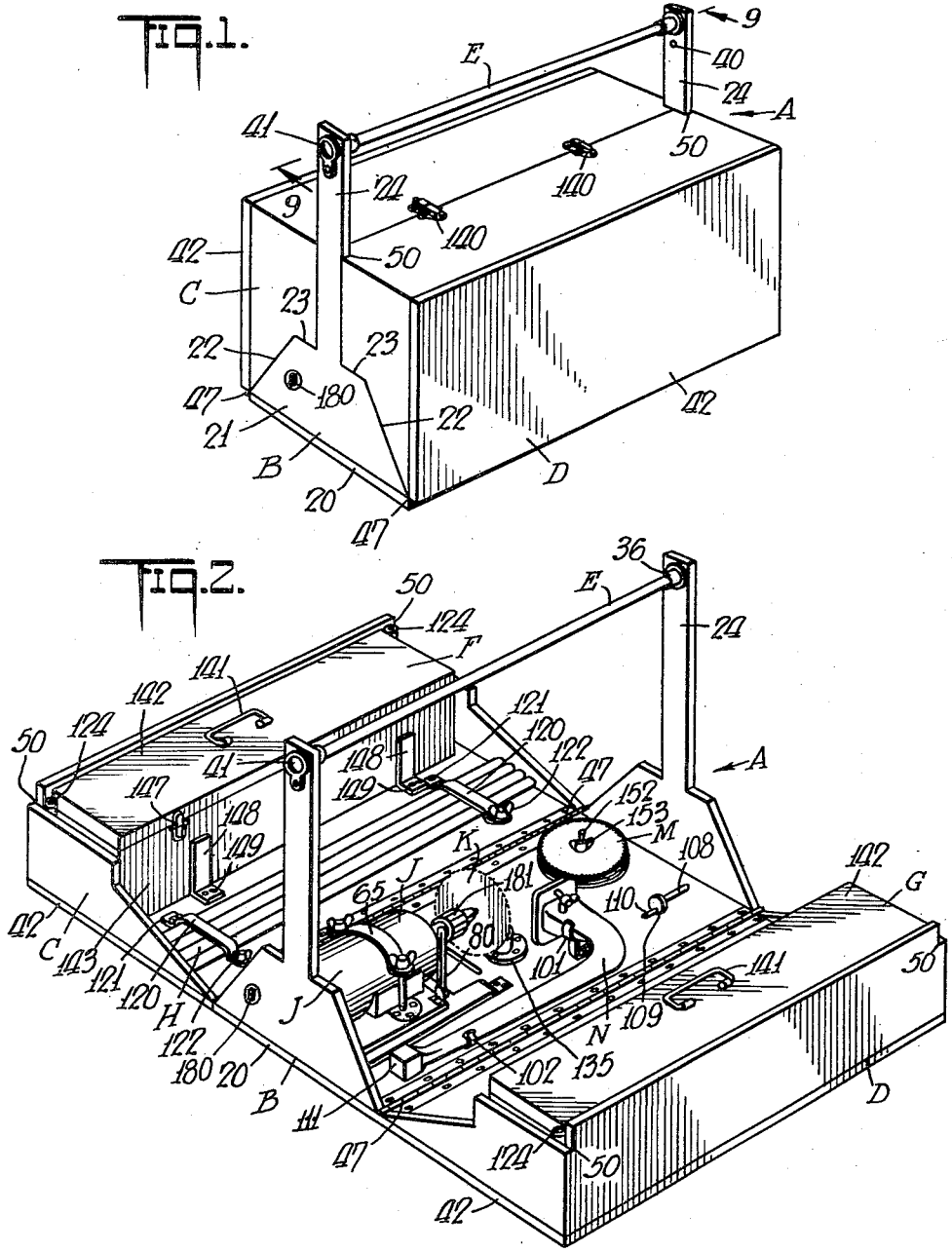
INVENTOR
Lawrence B. Barnett
BY
ATTORNEY

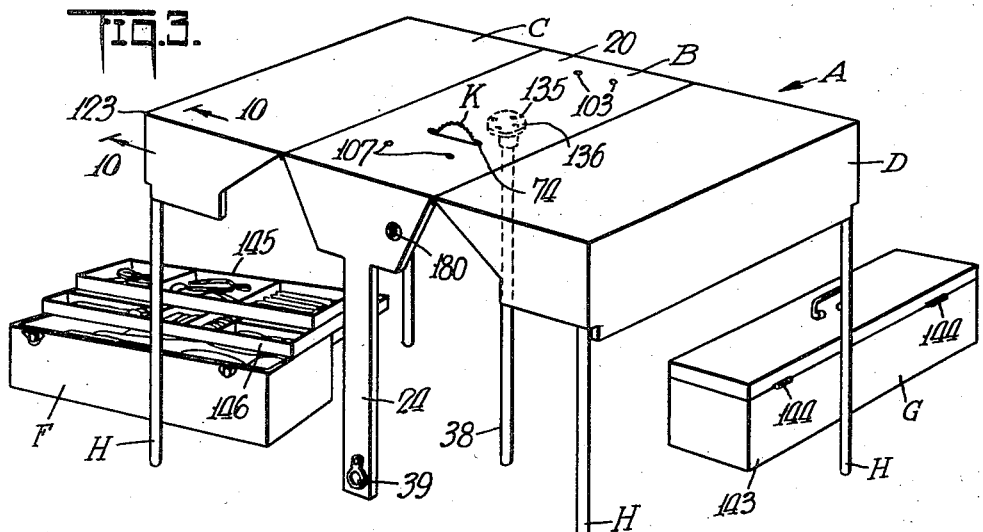
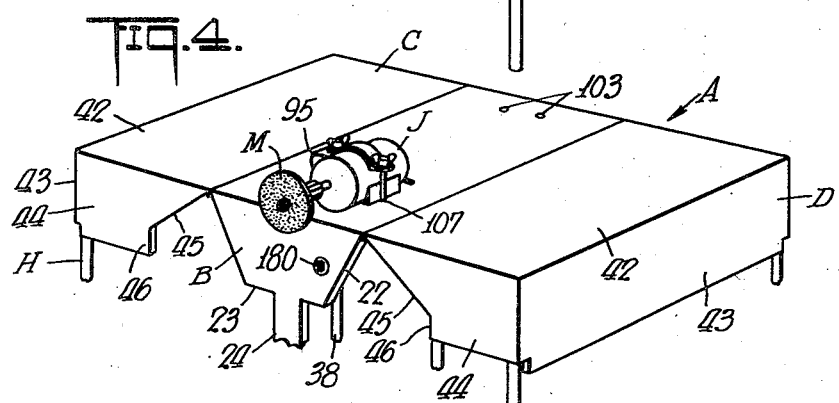
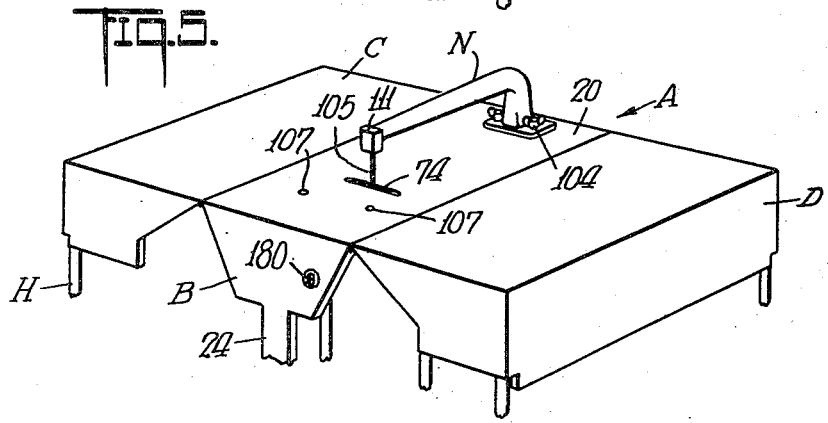

Dec. 21, 1954 L. B. BARNETT 2,697,460
COMBINED TOOL-CARRYING HINGED BOX AND POWER WORKTABLE
Filed Oct. 16, 1950 4 Sheets-Sheet 3
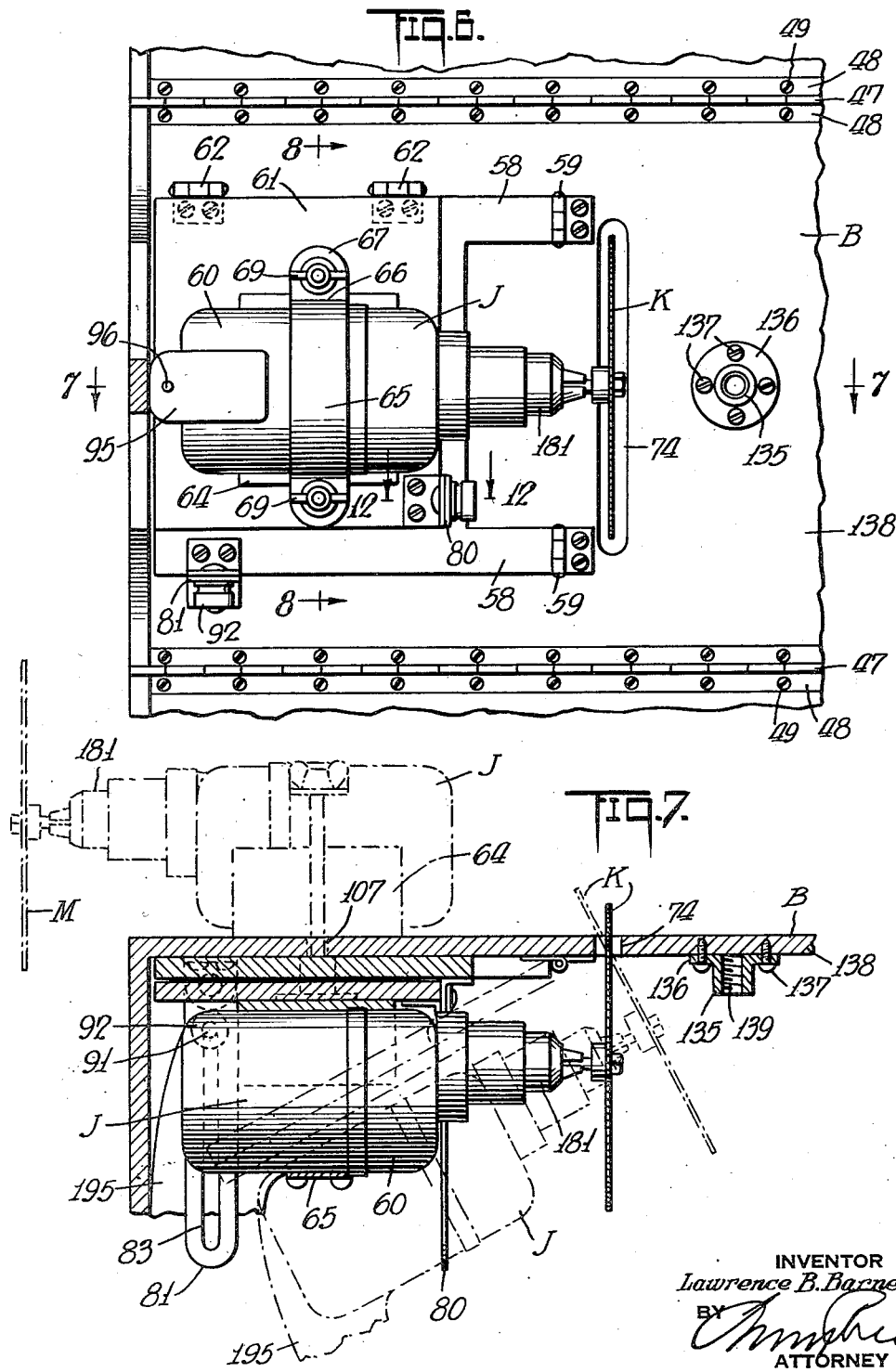
INVENTOR
Lawrence B. Barnett
BY
ATTORNEY Dec. 21, 1954 L. B. BARNETT 2,697,460
COMBINED TOOL-CARRYING HINGED BOX AND POWER WORKTABLE
Filed Oct. 16, 1950 4 Sheets-Sheet 4
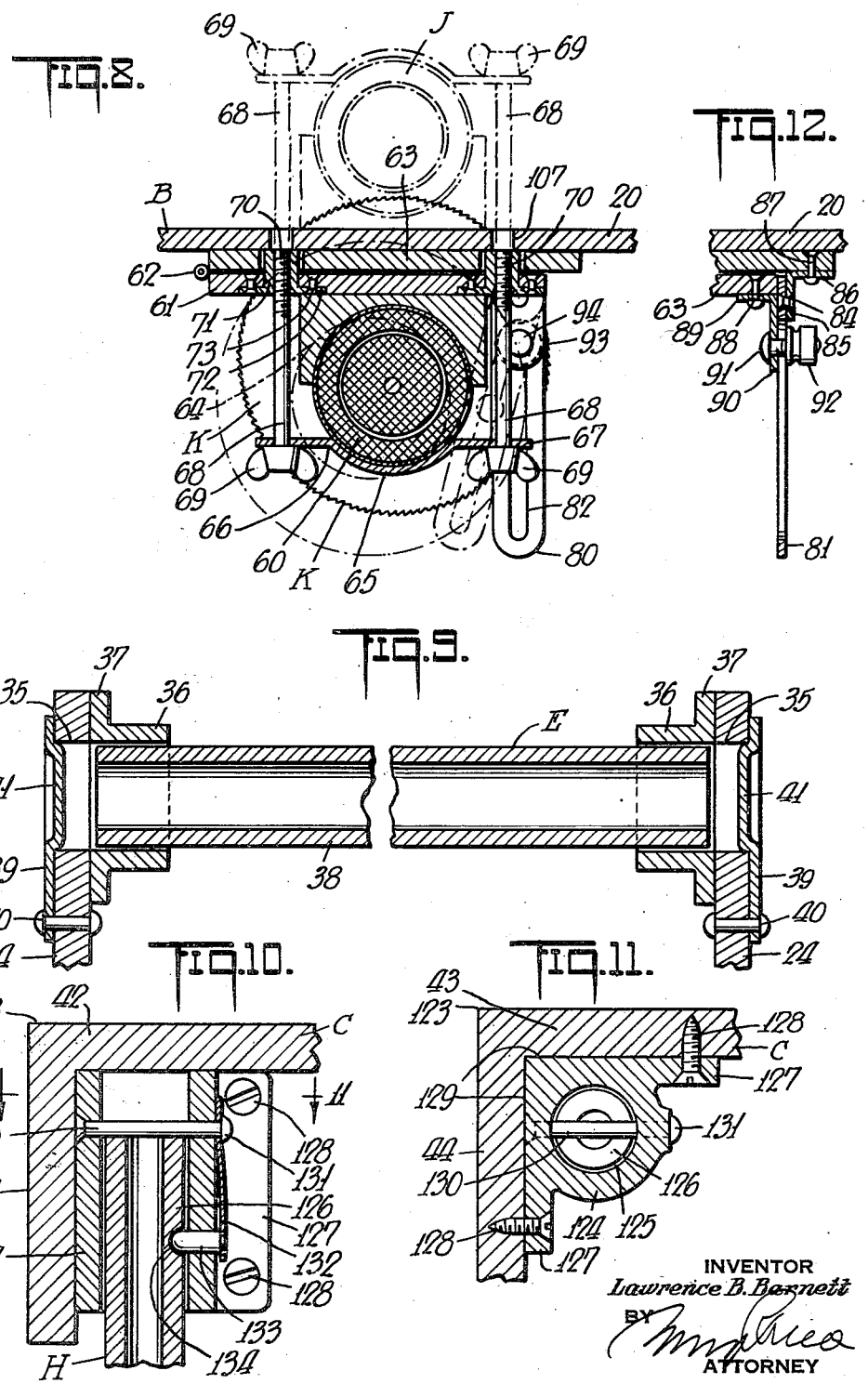
INVENTOR
Lawrence B. Barnett
BY
ATTORNEY United States Patent Office 2,697,460
Patented Dec. 21, 1954

2,697,460

COMBINED TOOL-CARRYING HINGED BOX AND POWER WORKTABLE

Lawrence B. Barnett, Jersey City, N. J.

Application October 16, 1950, Serial No. 190,396

2 Claims. (Cl. 144—285)

The present invention relates to a tool-carrying, hinged box and work table, and it particularly relates to a collapsible, reversible box which may conveniently be used for a work table.

It is among the objects of the present invention to provide a novel, collapsible, reversible tool-carrying box which may be utilized conveniently by carpenters, plumbers and other technicians and skilled workers for carrying their tools in a convenient assembly and which at the same time may be used when open and with the tools removed therefrom as a work table or bench for sawing and other operations.

A further object is to provide a novel, reversible work table which may be conveniently employed by plumbers, carpenters and the like to electrically operate tools and which when opened and reversed may be employed as a table for the operation of said tools.

In accomplishing the above objects, it has been found most satisfactory, according to one embodiment of the present invention, to provide a carrying case consisting of a flat bottom with upwardly extending sides and legs, the upper portion of which are connected by a rod or tube to form a carrying handle.

The sides of the box conveniently fold outwardly to form extensions of the base so that when the base is inverted, the base and sides will form a table which may conveniently be used as a work bench.

Desirably, the collapsible or reversible hinged box carries a series of rods or tubes which when open and reversed will serve to support the open box as a table.

The central base of the box may be used for carrying a motor, which motor may be provided with a round saw blade to project through a slot in the table.

It is also possible, if desired, to carry a motor, which may be removed from the interior of the box and exteriorly mounted to carry either an abrading wheel or other work-application means. It is conveniently possible to arrange the motor within the box so that the circular saw or other working means may be used at an angle or adjusted to give a desired type of cut or work application.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Fig. 1 is a top perspective view of the combined tool-carrying, hinged box in closed position, showing how the box may be carried by a handle.

Fig. 2 is a top perspective view showing the box of Fig. 1 in open position.

Fig. 3 is a top perspective view showing the open box of Fig. 2 inverted and made into a table, and also showing the circular saw in position, projecting through the slot thereon and also showing the tool kits removed from the case and supported on the floor.

Fig. 4 is a top perspective view of the table of Fig. 1, showing a motor and tool mounted exteriorly of the table.

Fig. 5 is a top perspective view similar to Figs. 3 and 4, showing a jig-saw mounted exteriorly on the table.

Fig. 6 is a bottom plan view taken from the central portion of the table of Fig. 3, upon an enlarged scale as compared to Fig. 3.

Fig. 7 is a perspective vertical sectional view taken upon the line 7—7 of Fig. 6.

Fig. 8 is a perspective vertical sectional view taken upon the line 8—8 of Fig. 6.

Fig. 9 is a fragmentary transverse vertical sectional view upon an enlarged scale as compared to Fig. 1, showing the handle-carrying arrangement, upon an enlarged scale as compared to Fig. 1.

Fig. 10 is a fragmentary vertical sectional view taken upon the line 10—10 of Fig. 3, showing the method of attaching the leg to the table, upon an enlarged scale as compared to Fig. 3.

Fig. 11 is a transverse horizontal sectional view taken upon the line 11—11 of Fig. 10.

Fig. 12 is a fragmentary side sectional view, showing the swinging support used for guiding the motor in its movement and also designed to clamp the motor in an adjusted position.

Referring to Figs. 1 to 5, there is shown a box A, having a middle section B and the side sections C and D, and a carrying handle E.

Interiorly of the carrying case A, as shown in Figs. 2 and 3, are provided tool chests F and G, which may be readily removed, as indicated in Fig. 3, from the open carrying case, as shown in Fig. 2.

As shown in Fig. 2, there is provided a series of legs H, which may be utilized to support the table in position, as indicated in Figs. 3, 4 and 5.

Within the base portion B of the table is provided the motor J to drive a circular saw K.

As shown in Fig. 4, the motor J may be mounted exteriorly for driving any suitable circular tool or device indicated at M in Fig. 2, such as a rotary saw blade, a grind wheel, a sanding wheel or disk and so forth.

A reciprocatory jig saw carrier or guide N may also be removed from the open case of Fig. 2 and mounted upon the table, as shown in Fig. 5. This saw is also driven by the motor J.

Referring to Figs. 1 to 5, the base B has the main table support member 20 and the side members 21, which are obliquely cut off at 22 and have the straight shoulders 23.

From the central portion of the side members 21 there extend upwardly the side legs 24. The side legs 24 extend upwardly as shown in Figs. 1, 2 and 9 to form the carrying handle E.

As shown in Fig. 9, the side members 24 are provided with the openings 35, to which are mounted the short, tubular members 36 having the attachment flanges 37.

The pipe or tube 38 may be inserted in the openings 35 and the tubes 36 to form a handle member. The tube 38 is held in position by means of the swinging lock members 39, which are pivotally mounted at 40 upon the legs 24.

The lock members 39 have the recessed portions 31 which lock into the openings 35, as shown in Fig. 9.

By removing the swinging members 39, it is possible to remove the tube 38 and use it as a middle leg, if desired, for example as shown in Fig. 3.

The side members C and D are each provided with a base 42, and the depending end portions 43 in the table structure of Figs. 3 to 5.

These end structures are also provided with side members 44, which have the obliquely cut-out edges 45 and the straight edges 46 to fit upon the corresponding edges 22 and 23 of the side members 21.

The hinged structure is best shown at 47 in Figs. 2 and 6. The hinge consists of two plates 48 screwed down by the members 49 to the sections B, C and D. The coinciding, tubular members of the hinge plates 48 receive the pivot rod.

It will be noted that the ends or corners of the sections C and D have cut-outs at 50 to fit around the side extensions 24, as best shown in Fig. 1.

The motor J, as shown in small scale in Fig. 2 and in larger scale in Figs. 6, 7 and 8, has a body 60 which is mounted upon the swinging table 61 and which is hinged at 62 to the base member 63, and in turn mounted to the under side of the table or base 20 by the double hinge 59 having the legs 58.

The motor body 60 fits in a cradle 64, which is carried on the swinging support 61. The top of the motor body is held in position by means of the curved, conforming portion 65 of the bracket 66. The ends 67 of the bracket 66 have the openings receiving the ends of the threaded rod 68.

On the ends of the threaded rod may be positioned the wing nuts 69.

The threaded portions 70 of the rods 68 screw into the tapped sleeves 71. The tapped sleeves 71 have flanges 72 held in position by the rivets 73 on the swinging plate 61.

The hinges 59 and 62 and the mounting plates 61 and 63 permit a substantial universal movement of the motor J together with the circular saw-blade K.

Swinging movement on the plate or board 63 will permit the blade K to be angled, as indicated in Fig. 7, as it projects through the slot 74 in the base 20 of the central section B of the table.

On the other hand, the swinging movement, due to the plate 61, as indicated in Fig. 8, will permit the saw-blade K to be withdrawn from the slot 74 when the apparatus is being carried, as shown in Fig. 1.

To guide and lock the motor J in an adjusted position, as indicated either in Fig. 7 or Fig. 8, the slotted guide rods 80 and 81 are provided, having the slots 82 and 83. These slotted guide members are provided with the pivotal connection 84 (see Fig. 12) on the vertical portion 85 of an angle bracket 86.

The angle bracket in Fig. 12 is shown mounted by the bolt or rivet 87 through the base 20 of the central section B.

The end of the swinging board member 63, as shown in Fig. 12, is provided with a bolt or pinion connection 88 to the flat member 89 of the angle bracket 90. The angle bracket 90 carries a threaded stud 91, which extends through the slot 83, and a wing nut 92, by means of which the board 63 may be clamped by said wing nut 92 in an adjusted position.

On the other slotted guide member 80 the wing nut 93 and the threaded stud 94 similarly serve to clamp the board 61 in an adjusted position.

The slotted members 80 and 81 swing, as indicated in Figs. 7 and 8, to accommodate the different positions of the motor J.

When it is desired to place the motor J on top of the table, as indicated in Fig. 4, the cradle 64 and the motor body J may be removed after the wing bolts 68 of the bracket 65 have been lifted.

After the motor has been placed upon the top of the table, as indicated in Figs. 4, 7 and 8, the wing bolts 68 may be threaded back into the sleeves 71, as indicated in the dot-and-dash lines in Figs. 7 and 8.

It is thus apparent that the motor J may be used either as a circular saw motor or as a grind wheel motor and either exteriorly or interiorly of the central member B.

The removable plate 95 connected at 96 to the structure 21 aids in supporting the motor body in the position shown in Fig. 6. The plate 95 is not shown in Fig. 7.

The reciprocatory saw holder N may also be conveniently removed from the clips 101 and 102, as shown in Fig. 2, and mounted at the openings 103 by the bolts 104 (see Fig. 5).

This member N carries the jig saw blade 105 which extends through the opening 74 in the base 20 of the central section B.

As shown in Fig. 2, the shaft 108 and the eccentric 109 may be mounted on the interior of the base 20. The pin 110 of the eccentric 109 will reciprocate the jig saw in a guide slot formed in the head 111 and in the slot 74 in the central section 20 of the table.

In respect to the legs H, these may be conveniently packaged together by means of the straps 120 (see Fig. 2), which are held down as indicated at 121 and have the detachable wing-nut connections 122. When the wing-nuts are removed and the straps 120 are released, the legs H may be removed.

The legs are mounted as best shown in Figs. 10 and 11.

The inside of the corners 123, as shown on Figs. 3, 10 and 11, is provided with a tubular receptacle 124 having a bore 125 in which the upper end 126 of the tubular leg is inserted.

The tubular receptacle 124 has the outstanding flanges 127, which are held in position by means of the screws 128. The inside faces 129 are flattened so as to abut the inside of the corner 123.

The pin 130 acts as a stop against the upper end 126 of the leg H.

The pin 130 has a head 131 with a leaf spring 132. The leaf spring 132 has a swinging stud 133 which fits into the recess 134 in the leg H to hold it in position.

Where it is desired to use a central, fifth leg, the member E is removed by swinging the cup elements 41 downwardly. This leg may then be inserted into the central receiver 135, which may be of the same construction as the elements 124, except that it has a flange 136 (see Figs. 2, 3 and 6).

The flange, as shown in Figs. 6 and 7, is attached by screws 137 to the under side 138 of the base 20 of the central section B. If desired, the interior of the sleeve 135 may be threaded at 139, in which case one end of the tubular handle E is also threaded.

The carrying case, as shown in Fig. 1, may be readily latched together by the standard latching arrangement 140 and it may be locked (see Fig. 1).

The tool carriers F and G may be of conventional type with the handle 141, the covers 142, the base container members 143, the hinges 144 and the tool trays 145 and 146.

The covers 142 may be latched down by the latches 147.

These tool carriers F and G are held in position by means of the flanges 148, which are mounted upon the under side of the members 42 by the angles 149.

The mounting rod 152 with the nut 153 may be utilized for mounting a number of instruments or tools in the position shown in Fig. 2.

It is thus apparent that the applicant has provided a simple, rugged, light-weight, readily carried, compact assembly capable of widespread utilization by technicians, such as carpenters or wood or metal workers, in general. The device is readily changed from the carrying position of Fig. 1 to the table position of Figs. 3, 4 and 5 by removing and attaching of the legs 38 and H. These legs are readily removed by lifting the springs 132 or by unscrewing the central leg 38 when the table is to be used again as the carrying case of Fig. 1.

The blade K may be kept out of the way by swinging the lower base member 61 outwardly and locking it in position by a wing nut on the slotted guide 80. On the other hand, the angle of the saw K may be readily changed by swinging the motor J upon the base member 63 and locking it in position in the slotted guide member 81.

The motor J and grind wheel M may be readily mounted upon the table, as shown in Fig. 4, by removing and reversing the wing bolt 68, the cradle 64 and the bracket 66 to the dot-and-dash position as shown in Figs. 7 and 8.

The jig saw guide device N may be readily removed from the clips 101 and 102 and mounted by the bolts 104 on top of the table 20, as shown in Fig. 5.

The jig saw blade 105 will then be driven by the eccentric 109 from the motor J.

The chuck 181 enables the rotary blade K or circular tools indicated at M to be readily mounted upon or dismounted from the motor J. In the position of Fig. 2, the blade K will have been removed and mounted in the stack M. The eccentric 109 may also be mounted by the chuck 181 on the motor J.

A power cable (not shown) may conveniently be connected to switch 180 and the supply cable of the motor J may also be connected to said switch 180 by readily removable and attachable plug connections. A three-wire cable connection may be employed to ground the unit while in use. The switch 180 is used to operate the motor J.

The motor J may be an electric hand drill motor which may be removed from the block 64 and strap 65 and used apart from the assembly shown in Figs. 1 to 5 as a separate hand drill or other hand tool. It is provided with a handle 195 as shown in Fig. 7. This handle 195 is not shown in Fig. 6.

In Fig. 2 the various circular tools, such as rotary blades, grind wheels, buffing wheels and so forth are shown at position M.

The portable tool kit and power table of the present invention may be used by carpenters, handymen, homeowners, motor mechanics, plumbers, plant maintenance men and so forth.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. An equipment carrying case having a base member and side swinging hinged closure members, said base member having a flat bottom and said side members having flat end walls, said bottom and walls when inverted and extended forming a table top, said bottom having attachments for carrying a tool-driving electric motor, said base member having upstanding side extensions provided at their upper ends with a removable cross bar forming a carrying handle and the outer corners of said closure members having tubular receptacles and four tubular removable legs inserted at one end into said tubular receptacles to form outside legs for the table.

2. An equipment carrying case having a base member and side swinging hinged closure members, said base member having a flat bottom and said side members having flat end walls, said bottom and walls when inverted and extended forming a table top, said bottom having attachments for carrying a tool-driving electric motor, said base member having side extensions and receptacles on said side extensions to receive a cross bar for removably receiving a cross bar serving as a handle and means at the outer corners of said closure members to receive legs forming the outside legs of said table.

References Cited in the file of this patent

UNITED STATES PATENTS

| Number | Name | Date |
|---|---|---|
| 970,774 | Young | Sept. 20, 1910 |
| 1,223,161 | Fazzini | Apr. 17, 1917 |
| 1,225,958 | Hopwood | May 15, 1917 |
| 1,541,211 | Ford | June 9, 1925 |
| 1,721,190 | Sleeper | July 16, 1929 |
| 2,020,216 | Sarac | Nov. 15, 1935 |
| 2,292,872 | Eastman | Aug. 11, 1942 |
| 2,352,685 | Brinker | July 4, 1944 |
| 2,473,022 | Fenske | June 14, 1949 |

FOREIGN PATENTS

| Number | Country | Date |
|---|---|---|
| 275,915 | Great Britain | Aug. 18, 1927 |